United States Patent
Seren et al.

(10) Patent No.: US 7,065,104 B1
(45) Date of Patent: Jun. 20, 2006

(54) METHOD AND SYSTEM FOR MANAGING INVERSE MULTIPLEXING OVER ATM

(75) Inventors: Cetin Seren, Pleasanton, CA (US); Manjunath Jagannatharao, San Jose, CA (US); Raja Rangarajan, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 719 days.

(21) Appl. No.: 09/751,496

(22) Filed: Dec. 28, 2000

(51) Int. Cl.
*H04J 3/04* (2006.01)

(52) U.S. Cl. .................... 370/536; 370/395.1; 370/535

(58) Field of Classification Search ................ 370/536, 370/394, 395, 471, 252, 410, 395.1, 395.7, 370/535

See application file for complete search history.

(56) References Cited

U.S. PATENT DOCUMENTS

| | | | |
|---|---|---|---|
| 5,065,396 A | | 11/1991 | Castellano et al. |
| 5,333,132 A | | 7/1994 | Chuniaud et al. |
| 5,400,324 A | | 3/1995 | Eriksson et al. |
| 5,404,354 A | | 4/1995 | Hayter et al. |
| 5,448,572 A | | 9/1995 | Knox et al. |
| 5,526,361 A | | 6/1996 | Hedberg |
| 5,608,733 A | | 3/1997 | Vallee et al. |
| 5,617,417 A | | 4/1997 | Sathe et al. |
| 5,764,637 A | | 6/1998 | Nishihara |
| 5,970,067 A | | 10/1999 | Sathe et al. |
| 6,002,670 A | * | 12/1999 | Rahman et al. .............. 370/238 |
| 6,205,142 B1 | * | 3/2001 | Vallee ......................... 370/394 |
| 6,222,858 B1 | * | 4/2001 | Counterman ................ 370/474 |
| 6,411,701 B1 | | 6/2002 | Stademann |
| 6,449,658 B1 | | 9/2002 | Lafe et al. |
| 6,549,522 B1 | | 4/2003 | Flynn |
| 6,621,794 B1 | * | 9/2003 | Heikkinen et al. .......... 370/235 |
| 6,678,275 B1 | * | 1/2004 | DeGrandpre et al. .... 370/395.7 |
| 6,680,954 B1 | * | 1/2004 | Cam et al. ................... 370/474 |
| 6,717,960 B1 | * | 4/2004 | Anesko et al. .............. 370/536 |

FOREIGN PATENT DOCUMENTS

| | | |
|---|---|---|
| WO | WO 90-12467 | 10/1990 |
| WO | WO 93-03569 | 2/1993 |

OTHER PUBLICATIONS

Richard Vallee, et al. The ATM Forum Technical Committee, Inverse Multiplexing for ATM.
(IMA) Specification Version 1.1 AF-PHY-0086.001 (Final Ballot—Draft #1) Dec., 1998 pp. 183.
I. Widjajat, et al., "A High-Capacity Broadband Packet Switch Architecture Based on Multilink Approach", MILCOM '92 Communications-Fusing Command, Control and.

(Continued)

*Primary Examiner*—Steven Nguyen
*Assistant Examiner*—Clemence Han
(74) *Attorney, Agent, or Firm*—Blakely, Sokoloff, Taylor & Zafman LLP (57) ABSTRACT

A method and system for managing inverse multiplexing over ATM is disclosed. In one embodiment, a method for use in a digital communications network, comprises monitoring a plurality of links to determine state changes of the links. An IMA-ID check is enforced when an insufficient links state is reached. The IMA-ID check is relaxed when all the links are in an error state. An IMA-ID check is re-enforced when at least one link of the plurality of links recovers from an error state.

20 Claims, 5 Drawing Sheets

OTHER PUBLICATIONS

-PCT Notification of Transmittal of the International Search Report of the Declaration for the International Application No. PCT/US95/10218, 7 pages (Dec. 5, 1995).

Katsuyuki Yamazaki et al., "ATM Transport with Dynaic Capacity Control for Interconnection of Private Networks", IEICE Transactions Comm., vol. E77-B, No. 3.

* cited by examiner

METHOD AND SYSTEM FOR MANAGING INVERSE MULTIPLEXING OVER ATM

FIELD OF THE INVENTION

The present invention pertains to communications and networking. More particularly, the invention relates to the usage of resources in networking devices.

BACKGROUND OF THE INVENTION

Packet switching communication networks are commonly employed to transfer digital information over long distances. One type of packet switching communication network is an asynchronous transfer mode communication network. An asynchronous transfer mode communication network enables the transfer of digital voice information, digital video information and digital data over short or long distances via common carrier communication links. Such a communication network enables a wide variety of communication devices to share common carrier communication links on a demand driven basis. For example, such asynchronous transfer mode communication networks are commonly employed for a wide area network (WAN) communication.

The common carrier communication links employed in such asynchronous transfer mode communication networks typically include relatively low speed metal wire based communication links. One such type of relatively low speed common carrier communication link available in North America is the T1 communication link. A typical T1 communication link provides a maximum data rate of 1.544 megabits per second. Similarly, the E1 common carrier communication links available in Europe provide a data rate of 2.048 megabits per second.

In addition, the common carrier communication links employed in such asynchronous transfer mode communication networks usually include higher speed communication links. An example of such a high-speed common carrier communication link available in North America is the T3 communication link, which provides a maximum data rate of 45 megabits per second. An example of a high-speed common carrier communication link available in Europe is the E3 communication link, which provides a maximum data rate of 34 megabits per second.

Prior asynchronous transfer mode communication networks that require high bandwidth communication links typically employ T3 or E3 communication links rather than the lower speed T1 or E1 communication links. Unfortunately, the subscription rates for such T3 common carrier communication links are usually much higher than the subscription rates for T1 or E1 links. Moreover, in North America such T3 common carrier communication links are not as widely available as T1 common carrier communication links. Worse yet, in Europe E3 common carrier communication links are rarely available and E1 common carrier communication links have only recently become widely available.

As a consequence, communication services requiring such high bandwidth communication links typically require a high premium payment for such high speed common carrier communication links. Moreover, such required high-speed communication links may not be available in some areas for such an asynchronous transfer mode communication network.

In addition, some prior asynchronous transfer mode communication networks require communication links with a bandwidth higher than is provided by low speed common carrier communication links such as T1 or E1 but do not require the high bandwidth of the T3 or E3 common carrier communication links. Unfortunately, communication services requiring such medium level bandwidth communication links must typically employ expensive high-speed common carrier communication links even though the full bandwidth range is not needed. For example, an asynchronous transfer mode communication network requiring a maximum data rate of 10 or 20 megabits per second must usually employ high speed T3 or E3 common carrier communication links. Such high-speed common carrier links unnecessarily increase the cost of communication for subscribers to such an asynchronous transfer mode communication networks.

Figure 1A:
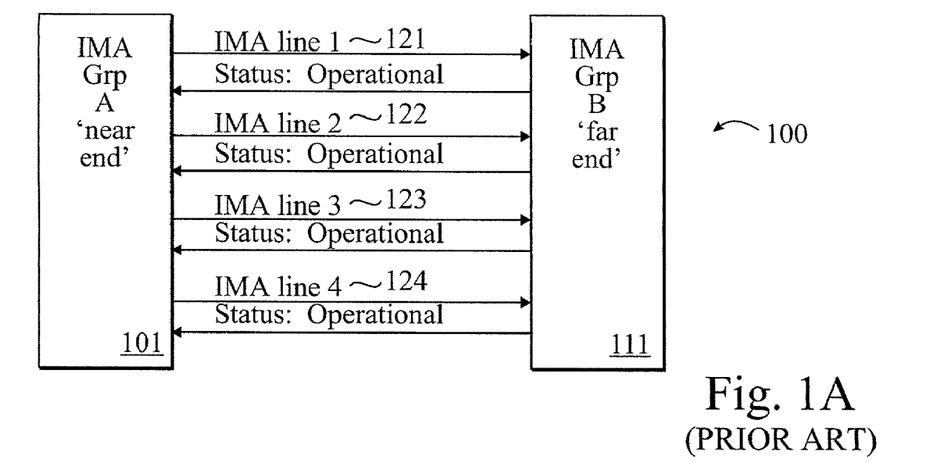
FIG. 1A shows a prior art IMA system.
Figure 1B:
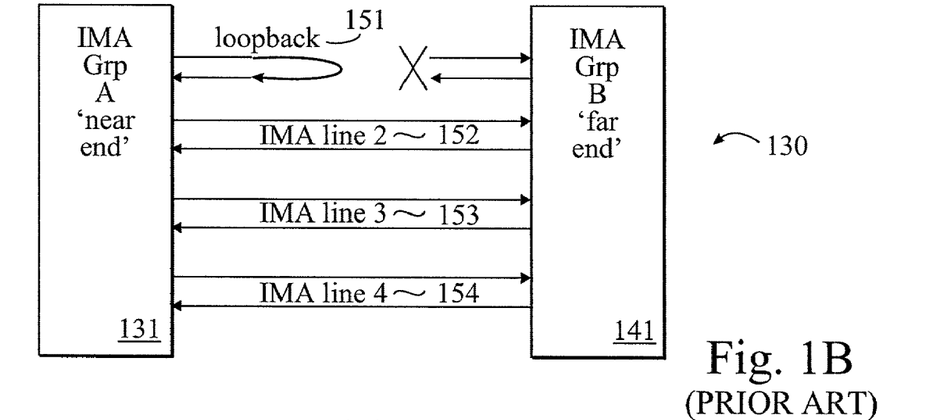
FIG. 1B shows a prior art IMA system with one link in loopback.
Figure 1C:
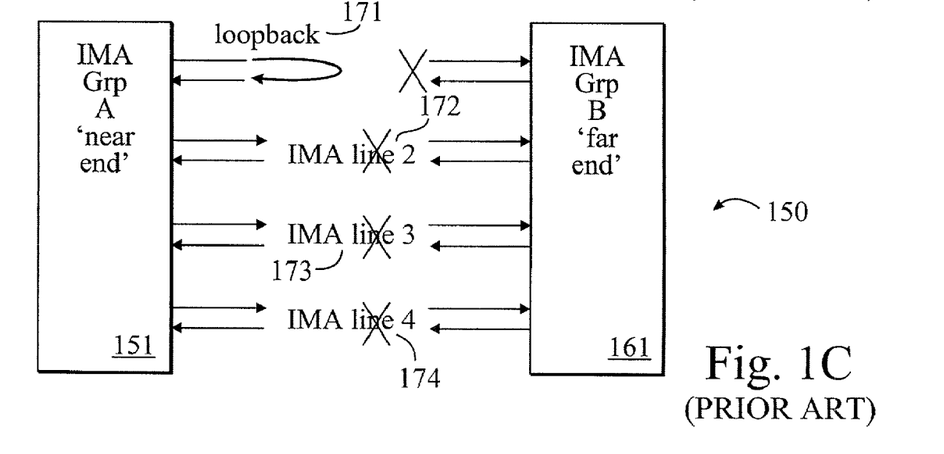
FIG. 1C shows a prior art IMA system with one link in loopback and the remaining links broken.

In an Inverse Multiplexing for ATM (IMA) system, ATM cell traffic is transported by means of time-division multiplexing over several channels (typically T1 or E1 data links). In a cell based IMA system, these ATM cells are sent on each channel in a round-robin fashion as depicted in FIGS. 1A–1C.

The receiving IMA device must reconstruct its output stream from cells received over the constituent channels, in such a way that cell sequence integrity is preserved.

Referring to the figures, the basic function of IMA device is to work in pairs to take an ATM cell stream coming from the ATM layer, send it over the multiple links by spreading cells over the available links and ensure that the initial cell stream can be retrieved at the far end. Thus the IMA preferably makes the ATM traffic transparent to the ATM layer over multiple links in use. As far as the ATM layer is concerned, it should only see a pipe (can be considered as a virtual link) whose rate is now the sum of the multiple link rates. It is assumed that each link is run in clear-mode without the presence of intermediate ATM nodes processing ATM cells. This means that there should be no cell discard by any intermediate transmission equipment.

SUMMARY OF THE INVENTION

What is disclosed is a method and system for managing inverse multiplexing over ATM. In one embodiment, a method for use in a digital communications network, comprises monitoring a plurality of links to determine state changes of the links. An IMA-ID check is enforced when an insufficient links state is reached. The IMA-ID check is relaxed when all the links are in an error state. An IMA-ID check is re-enforced when at least one link of the plurality of links recovers from the error state.

Other features and advantages of the present invention will be apparent from the accompanying drawings and from the detailed description that follows below.

BRIEF DESCRIPTION OF THE DRAWINGS

The present invention is illustrated by way of example and not limitations in the figures of the accompanying drawings, in which like references indicate similar elements, and in which.

DETAILED DESCRIPTION

A method and system for managing IMA. As described in detail below, in one embodiment of the present invention, a method for use in a digital communications network, comprises monitoring a plurality of links to determine state changes of the links. An IMA-ID check is enforced when an insufficient links state is reached. The IMA-ID check is relaxed when all the links are in an error state. An IMA-ID check is re-enforced when at least one link of the plurality of links recovers from an error state.

In one embodiment, the present method and system address when far end IMA devices may change, or when office wires may be misconnected to a far end device. As described in detail below, these unintended data transmissions are corrected. In another embodiment, the present method and system address what occurs when links are put into a loopback state where the IMA group does not know if it should be communicating with itself or if it should be communicating with a far end IMA device. As described in detail below, the data transfer between a near end device in loopback and an intended far end IMA device are assured.

Although embodiments of the present invention are described as having both software and hardware elements, alternative embodiments may be all hardware, all software, or a combination of each. The software implementing the present invention can be stored in RAM, a mass storage device available through disk interface, or other storage medium accessible to a CPU. This software may also be resident on an article of manufacture comprising a computer usable mass storage medium or propagated digital signal having computer readable program code embodied therein and being readable by the mass storage medium.

FIG. 1A shows a prior art fully operational IMA system 100, such as that described in Inverse Multiplexing for ATM (IMA) Specification, ATM Forum Technical Committee, December 1998, herein incorporated by reference. IMA Group 101 has four links (IMA lines 121–124) to IMA group 111. Lines 121–124 may be high-speed data lines such as T1, E1, J1, T3, E3, or J3 connections. Lines 121–124 are bi-directional. In one example, data cells are transmitted from IMA group 101 in a round-robin multiplexed fashion over lines 121–124. IMA group 111 reconstructs the multiplexed cells. IMA groups 101, 111 may be IMA entities, such as, routers or concentrators for pumping data into a switch.

FIG. 1B shows a prior art IMA system 130 with one link in loopback. Line 151 may be a faulty line and placed in loopback. When line 151 is in loopback, cells from IMA Group 131 are not transmitted over line 151. Typically a system operator places a line into loopback.

FIG. 1C shows a prior art IMA system 150 with one link 171 in loopback and the remaining links 171–174 broken. For example, lines 171–174 may have been physically cut or damaged. IMA groups 151 and 161 go into a "failed" state and alarms occur. When IMA Groups 151, 161 restart, line 171 in loopback comes out of alarm faster than lines 172–174. IMA group 161 is completely cut off, and IMA group 151 "talks" to itself via loopbacked link 171. Since line 171 will be the first line to become operational after restart, an IMA connection is established with itself. However, lines 172–174 will not have matching IMA parameters and be declared unusable. Thus, upon restart, instead of synchronizing with IMA Group 161, IMA group 151 synchronizes with itself. However, loopbacks are an essential part of maintenance.

Figure 2:
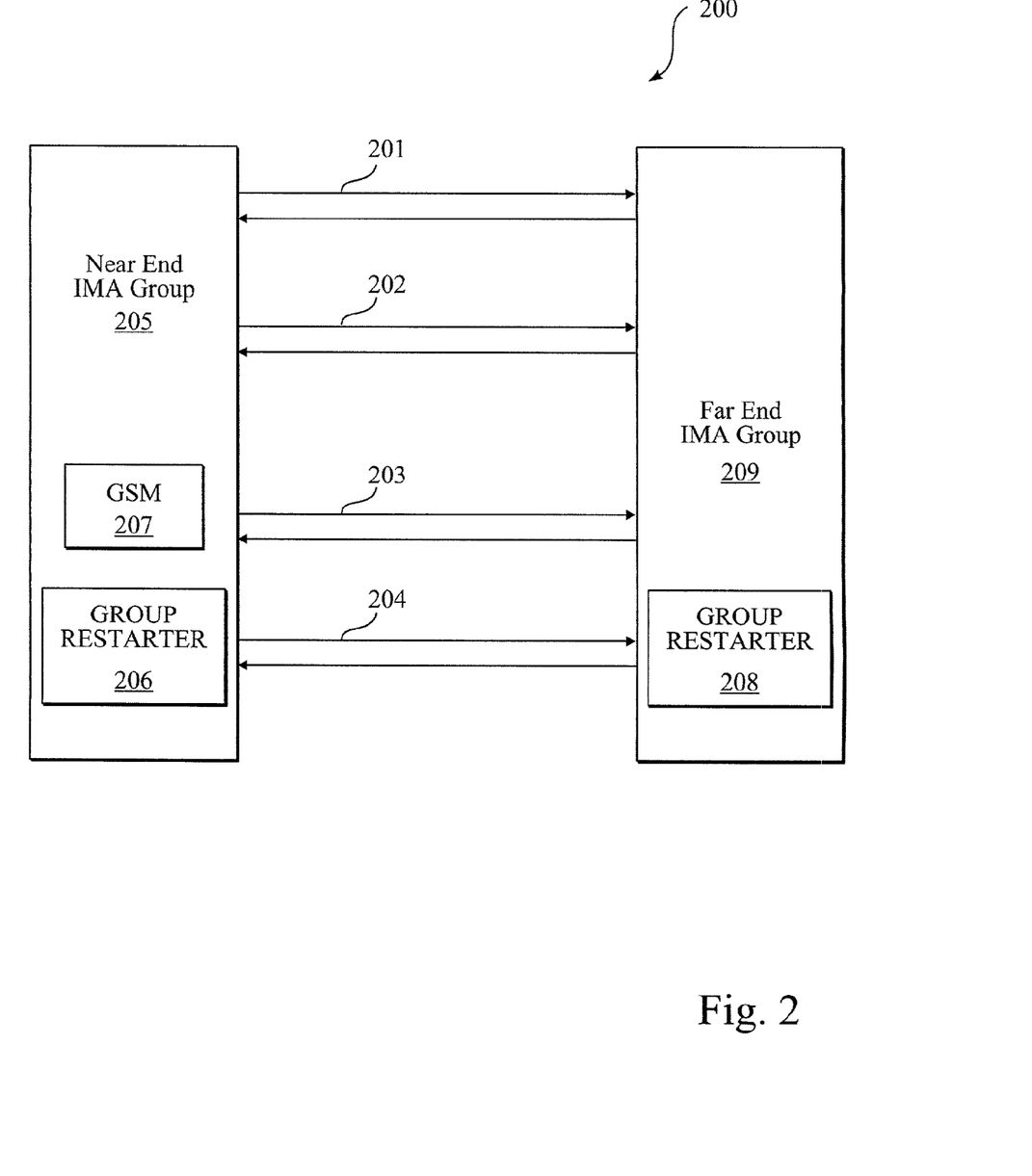
FIG. 2 shows an enhanced IMA system.

FIG. 2 shows an enhanced IMA system 200. System 200 includes a Near End IMA Group 205 with links 201 to 204. Far End IMA Group 209 is also connected to links 201 to 204. IMA Groups 205, 209 may be IMA entities, such as routers or concentrators for pumping data into a switch. Links 201–204 may by high-speed data lines, such as E1, T1, J1, E3, T3, or J3 data lines. IMA Group 205 includes Group Restarter 206. Group restarter 206 facilitates IMA Group start-ups as will be discussed in detail below. Also included in IMA group 205, is a group state machine (GSM) 207 which monitors if the links enter an insufficient links state. Although each IMA group 205, 209 is depicted as having a Group Restarter 206, in alternate embodiments only one Group Restarter 206, 208 may be implemented according to the present method and system.

Figure 3:
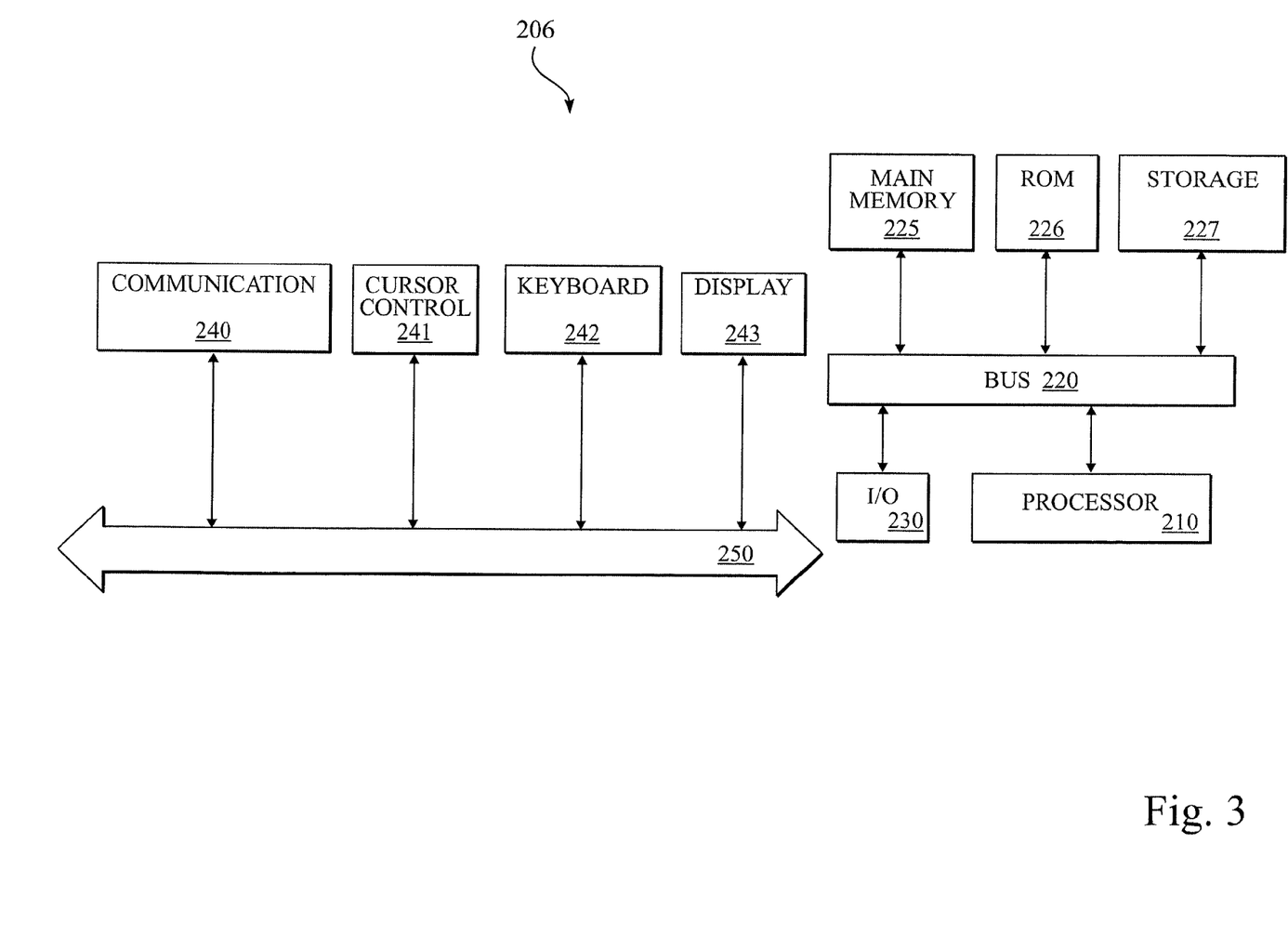
FIG. 3 shows a block diagram of a group restarter.

FIG. 3 shows a block diagram of a group restarter 206. One embodiment of group restarter 206 comprises a system bus 220 for communicating information, and a processor 210 coupled to bus 220 for processing information. Group restarter 206 further comprises a random access memory (RAM) or other dynamic storage device 225 (referred to herein as main memory), coupled to bus 220 for storing information and instructions to be executed by processor 210. Main memory 225 also may be used for storing temporary variables or other intermediate information during execution of instructions by processor 210. Group restarter 206 also may include a read only memory (ROM) and/or other static storage device 226 coupled to bus 220 for storing static information and instructions used by processor 210.

A data storage device 227 such as a magnetic disk or optical disc and its corresponding drive may also be coupled to group restarter 206 for storing information and instructions. Group restarter 206 can also be coupled to a second I/O bus 250 via an I/O interface 230. A plurality of I/O devices may be coupled to I/O bus 250, including a display device 243, an input device (e.g., an alphanumeric input device 242 and/or a cursor control device 241). For example, video news clips and related information may be presented to the user on the display device 243.

The communication device 240 is for accessing other computers (servers or clients) via a network. The communication device 240 may comprise a modem, a network interface card, or other well known interface device, such as those used for coupling to Ethernet, token ring, or other types of networks.

Figure 4:
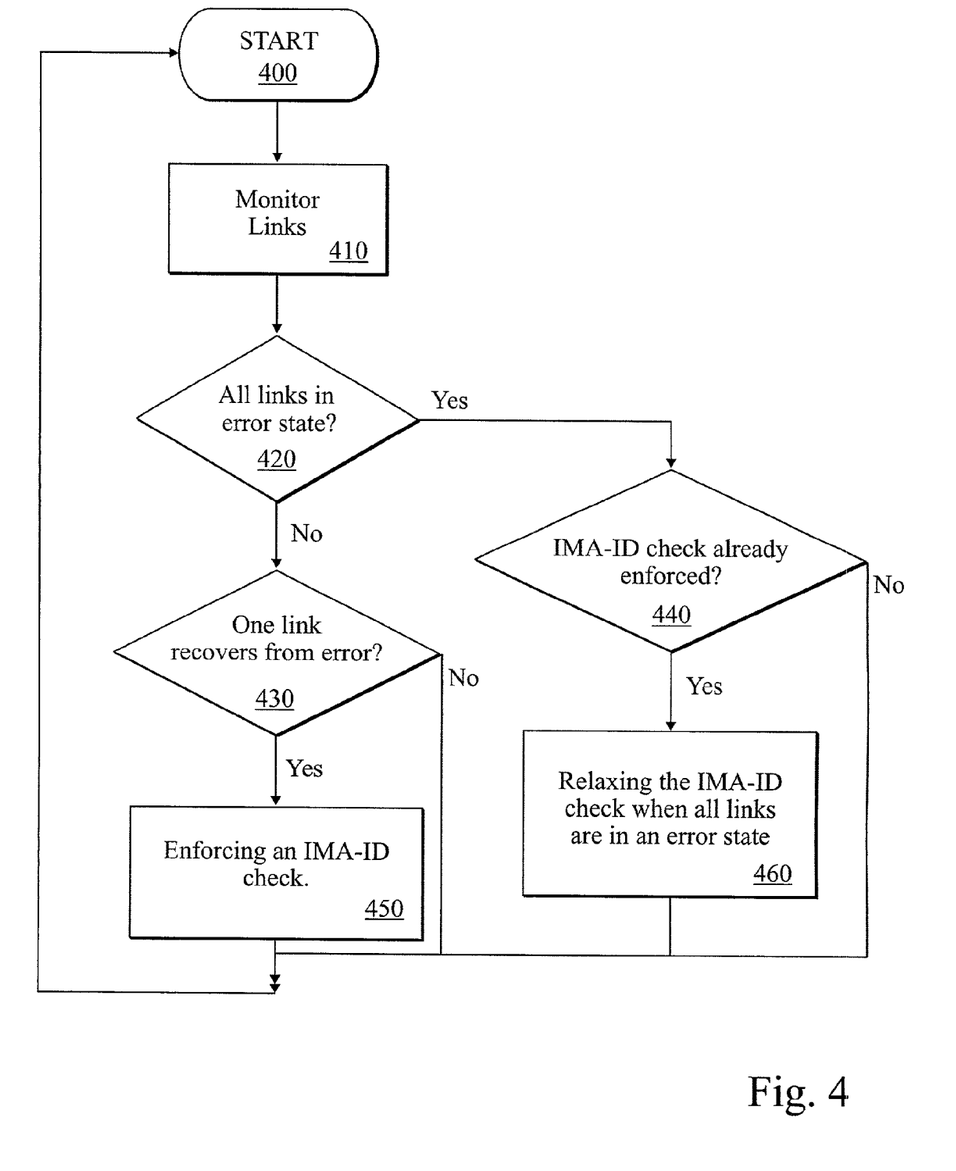
FIG. 4 shows a flow diagram of process performed by group restarter to selectively allow the restart of IMA groups.

FIG. 4 shows a flow diagram of process performed by group restarter 206 to selectively allow the restart of IMA groups. The process of FIG. 4 may establish new connections with an IMA group when it appears that a new IMA group is connected. Furthermore, the process of FIG. 4 will maintain the links between two IMA groups when a link may be in a loopback state. Prior to beginning the process of FIG. 4, a group state machine (GSM) 207 is started and initialized. The IMA ID check is enforced for all links and the GSM 207 enters an insufficient link state. This may occur, for example when a new device is about to be connected to a network as a far end IMA group. Then, the individual links are monitored by a link state machine (LSM) as described below.

The process starts at block 400. At processing block 410, group restarter 206 monitors operational links 201–204. At decision block 420, links 201–204 are monitored to detect if all the links are in an error state. If not all links are in error, then flow continues to decision block 430. If all the links in group 205 are in error, then flow continues to decision block 440. At decision block 440, group restarter 206 checks to see if an IMA-ID check has already been enforced. If the check has not been enforced already, then flow passes to start block 400. If the check has been enforced, then flow passes to processing block 460. By enforcing an IMA-ID check, a link is only accepted if the far end IMA-ID matches a predetermined (expected) IMA-ID derived from the same link as described in detail below. At processing block 460, the IMA-ID check is relaxed and flow returns to start block 400. By relaxing an IMA-ID check, the IMA-ID check requirement is disregarded for a particular link. The IMA-ID check is relaxed to minimize the alarms that occurs when all links are in error. Thus, block 460 relaxes an IMA-ID check in certain cases, for example, when an IMA Group is replaced. After relaxing the IMA-ID check, flow continues back to start block 400.

If all links are not in error and flow continued to decision block 430, links 201–204 are monitored to detect if any one recovers from an error. If all links are operational and there is no error recovery, then flow passes back to start block 400. If group restarter 206 detects that a link 201–204 has recovered from an error, flow continues to processing block 450. At processing block 450 in the IMA-ID check is enforced as follows. If the IMA-ID does not match, the link is broken and made unusable. If the IMA-ID matches, the link is maintained. Then, flow passes back to start block 400. Thus, an IMA-ID check is enforced in cases where a link 201–204 recovers from an error and is still connected to the same IMA group 206. No alarms occur.

FIG. 4 may be modified to accommodate special conditions, such as when lines are in loopback. To detect if a line is in loopback, an additional condition is added to decision blocks 410, which is to check that the IMA group IDs are different.

Every IMA Group has an identifier (ID). Cells are transmitted between two IMA groups. One out of every 128 cells transmitted between two IMA groups includes an IMA Control Protocol Cell (ICP). The ICP is a 53 byte cell that contains the IMA Group's ID (IMA-ID). The IMA-ID may not be unique since it is established independently of neighboring IMA Groups. Furthermore, IMA-ID's are only 8 bits in length. Every 128 cells, the IMA-ID is checked to see if it matches an expected IMA-ID as established during initialization of the links. The IMA-ID is checked by a Frame Synchronization Mechanism (FSM).

The process of FIG. 4 institutes two new actions, a relax IMA-ID check action and an enforce IMD-ID check action. These two additional actions will allow IMA groups to be resynchronized on a per group basis. IMA groups that are resynchronized establish data connectivity with a far end IMA device. In addition, an IMA Group ID may be made persistent. For example, an IMA Group's ID will be expected to be the same, both before and after resetting the line card upon which the IMA Group resides.

Figure 5:
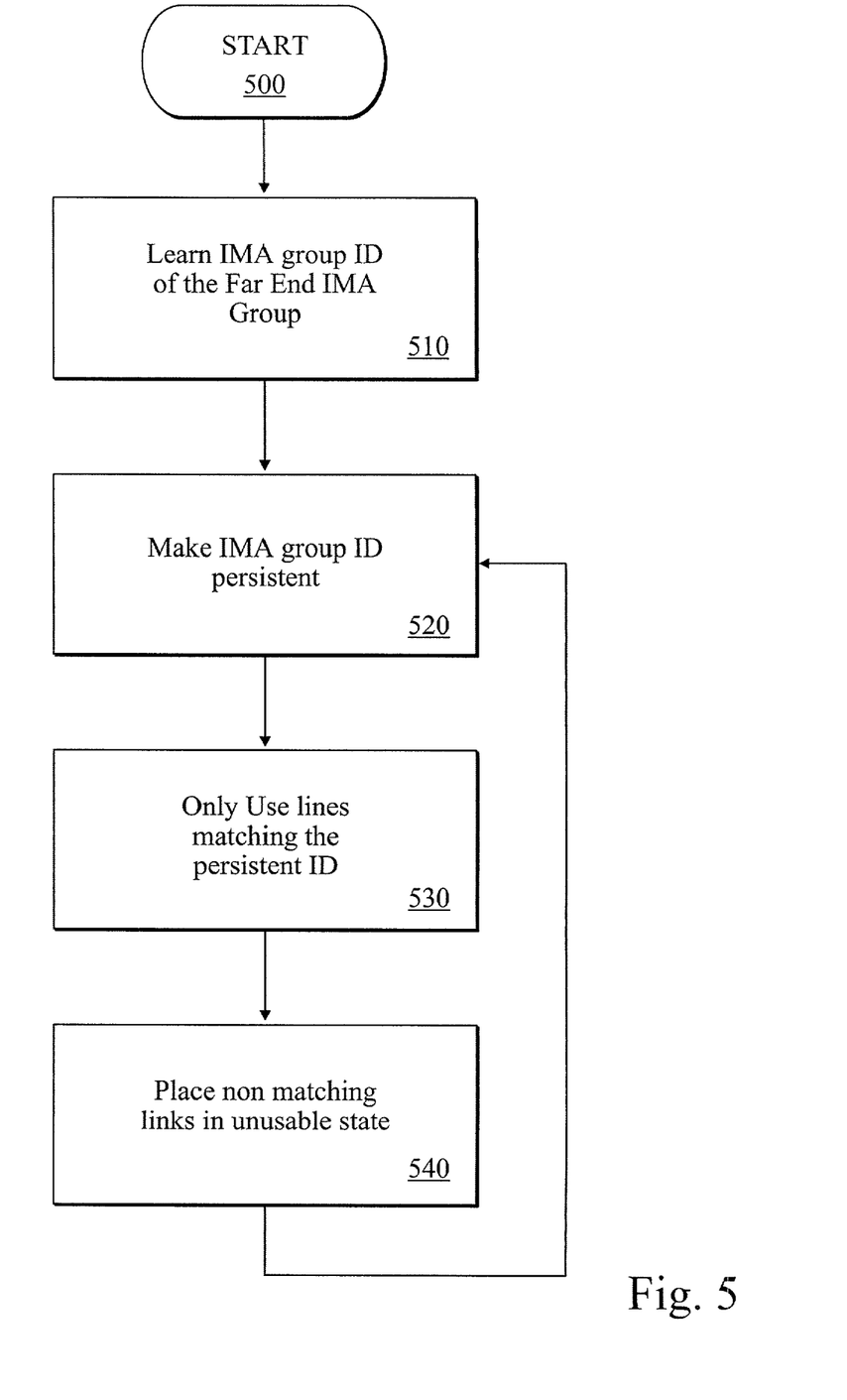
FIG. 5 shows a process performed by a group restarter for making a group ID persistent.

FIG. 5 shows a process performed by a group restarter for making a group ID persistent. Group restarter 206 learns the IMA group ID of IMA group 209, by reading it from an ICP cell as described above at processing block 510. At processing block 520, the IMA group ID is made persistent by storing in storage 227 the ID value obtained at block 510 at block 530, only links are used that have an IMA group with the same ID stored in storage 227 will be used. At processing block 540, non-matching links are placed in an unusable state. Flow continues back to processing block 520 as described above. The process of FIG. 5 is used when an IMA group has not been replaced.

In another embodiment, a process may be performed by a group restarter for relearning a group ID. The IMA group 205 is restarted. Then, the IMA-group ID of group 209 is learned from the ICP cell as described above. The IMA group ID is made persistent by storing in storage 227 the ID value learned. The new IMA ID is provided to the FSM for the IMA-ID check. All operational links are then established.

The IMA groups were designed so that once a link is established it should never change. That rigidity was invoked to divert security breaches. However, when all links are down, in the case where the links have been reconnected to another IMA entity, a new far-end IMA device should be accepted. The process does not restart the whole group or reset the card on which the IMA entity resides, because there will be a 5–10 minute system outage resulting in data loss.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawing are, accordingly, to be regarded in an illustrative rather than a restrictive manner.

What is claimed is:

1. In a digital communications network, a method comprising:
    monitoring a plurality of links to determine state changes of the links between a first inverse multiplexing for asynchronous (IMA) group and a second IMA group;
    enforcing an inverse multiplexing for asynchronous transfer mode identification (IMA-ID) check when an insufficient links state is reached, such that a link for which a near end IMA-ID matches a far end IMA-ID is maintained and a link for which a near end IMA-ID does not match a far end IMA-ID is disabled;
    relaxing the IMA-ID check when all the links are in an error state; and
    re-enforcing an IMA-ID check when at least one link of the plurality of links recovers from an error state to resynchronize the first IMA group and the second IMA group on a per group basis.

2. In a digital communications network, a method comprising:
    restarting an existing inverse multiplexing for asynchronous transfer mode (IMA) groups to resynchronize a first IMA group and a second IMA group on a per group basis, comprising:
    learning an IMA group ID of a far end IMA group;
    storing the IMA group ID in a memory such that the IMA group ID is made persistent;
    using only links matching the IMA group ID; and
    placing non-matching links in an unusable state.

3. The method of claim 2, wherein learning an IMA group ID further comprises:
    resynchronizing the first IMA group and the second IMA group; and
    extracting the IMA group ID from a first connected link.

4. The method of claim 2, wherein using only matching links further comprises screening IMA links having an IMA group ID that are involved in unintentional IMA group restarts for a matching stored IMA group ID.

5. The method of claim 2, further comprising looping back all links.

6. The method of claim 2, further comprising marking all links as unusable.

7. In a digital communications network, a system comprising:
- means for monitoring a plurality of links to determine state changes of the links between a first inverse multiplexing for asynchronous (IMA) group and a second IMA group;
- means for enforcing an inverse multiplexing for asynchronous transfer mode identification (IMA-ID) check when an insufficient links state is reached such that a link for which a near end IMA-ID matches a far end IMA-ID is maintained and a link for which a near end IMA-ID does not match a far end IMA-ID is disabled;
- means for relaxing the IMA-ID check when all the links are in an error state; and
- means for re-enforcing an IMA-ID check when at least one link of the plurality of links recovers from an error state to resynchronize the first IMA group and the second IMA group on a per group basis.

8. In a digital communications network, a system comprising:
- means for restarting an existing inverse multiplexing for asynchronous transfer mode (IMA) groups to resynchronize a first IMA group and a second IMA group on a per group basis, comprising:
- means for learning an IMA group ID of a far end IMA group;
- means for storing the IMA group ID in a memory such that the IMA group ID is made persistent;
- means for using only links matching the IMA group ID; and
- means for placing non-matching links in an unusable state.

9. The system of claim 8, wherein learning an IMA group ID further comprises:
- means for resynchronizing the first IMA group and the second IMA group; and
- means for extracting the IMA group ID from a first connected link.

10. The system of claim 8, wherein using only matching links further comprises screening IMA links having an IMA group ID that are involved in unintentional IMA group restarts for a matching stored IMA group ID.

11. The system of claim 8, further comprising looping back all links.

12. The system of claim 8, further comprising marking all links as unusable.

13. A computer-readable medium having stored thereon a plurality of instructions, said plurality of instructions when executed by a computer, cause said computer to perform the method comprising:
- monitoring a plurality of links to determine state changes of the links between a first inverse multiplexing for asynchronous (IMA) group and a second IMA group;
- enforcing an inverse multiplexing for asynchronous transfer mode identification (IMA-ID) check when an insufficient links state is reached such that a link for which a near end IMA-ID matches a far end IMA-ID is maintained and a link for which a near end IMA-ID does not match a far end IMA-ID is disabled;
- relaxing the IMA-ID check when all the links are in an error state; and
- re-enforcing an IMA-ID check when at least one link of the plurality of links recovers from an error state to resynchronize the first IMA group and the second IMA group on a per group basis.

14. A computer-readable medium having instructions thereon, which when executed by a processor, cause the processor to perform the following comprising:
- restarting an existing inverse multiplexing for asynchronous transfer mode (IMA) groups to resynchronize a first IMA group and a second IMA group on a per group basis, comprising:
- learning an IMA group ID of a far end IMA group;
- storing the IMA group ID in a memory such that the IMA group ID is made persistent;
- using only links matching the IMA group ID; and
- placing non-matching links in an unusable state.

15. The computer-readable medium of claim 14 having stored thereon additional instructions, said additional instructions when executed by a computer for learning an IMA group ID, cause said computer to further perform:
- resynchronizing the first IMA group and the second IMA group; and
- extracting the IMA group ID from a first connected link.

16. The computer-readable medium of claim 14 having stored thereon additional instructions, said additional instructions when executed by a computer for using only matching links, cause said computer to further perform screening IMA links having an IMA group ID that are involved in unintentional IMA group restarts for a matching stored IMA group ID.

17. The computer-readable medium of claim 14 having stored thereon additional instructions, said additional instructions when executed by a computer, cause said computer to further perform looping back all links.

18. The computer-readable medium of claim 14 having stored thereon additional instructions, said additional instructions when executed by a computer, cause said computer to further perform marking all links as unusable.

19. A line card for use in a switch, comprising:
- a central processing unit (CPU);
- a system controller connected to the central processing unit;
- random access memory (RAM) connected to the system controller; and
- a group restarter connected to the CPU, controller, and RAM wherein the group restarter restarts an inverse multiplexing for asynchronous transfer mode (IMA) group and wherein the processor monitors a plurality of links to determine state changes of the links and enforces an inverse multiplexing for asynchronous transfer mode identification (IMA-ID) check when an insufficient links state is reached such that a link for which a near end IMA-ID matches a far end IMA-ID is maintained and a link for which a near end IMA-ID does not match a far end IMA-ID is disabled to resynchronize a first IMA group and a second IMA group on a per group basis.

20. The switch of claim 19 wherein the processor relaxes the IMA-ID check when all the links are in an error state and re-enforces an IMA-ID check when at least one link of the plurality of links recovers from an error state.

* * * * *